United States Patent
Cohen (10) Patent No.: US 9,087,056 B2
(45) Date of Patent: Jul. 21, 2015

(54) SYSTEM AND METHOD FOR PROVIDING AUGMENTED CONTENT

(71) Applicant: Gary M. Cohen, Kinnelon, NJ (US)

(72) Inventor: Gary M. Cohen, Kinnelon, NJ (US)

(*) Notice: Subject to any disclaimer, the term of this patent is extended or adjusted under 35 U.S.C. 154(b) by 97 days.

(21) Appl. No.: 13/752,063

(22) Filed: Jan. 28, 2013

(65) Prior Publication Data

US 2014/0210855 A1 Jul. 31, 2014

(51) Int. Cl.
*G09G 5/00* (2006.01)
*G06F 17/30* (2006.01)
*G06F 3/01* (2006.01)
*G06T 11/00* (2006.01)

(52) U.S. Cl.
CPC .......... *G06F 17/30017* (2013.01); *G06F 3/013* (2013.01); *G06F 17/30058* (2013.01); *G06T 11/00* (2013.01)

(58) Field of Classification Search
CPC ..................................................... G06F 3/013
USPC ......................................................... 345/633
See application file for complete search history.

(56) References Cited

U.S. PATENT DOCUMENTS

| | | | |
|---|---|---|---|
| 2004/0174496 A1* | 9/2004 | Ji et al. ........................... | 351/209 |
| 2006/0256133 A1* | 11/2006 | Rosenberg ..................... | 345/619 |
| 2008/0253737 A1* | 10/2008 | Kimura et al. ................... | 386/68 |
| 2009/0141147 A1 | 6/2009 | Alberts et al. | |
| 2009/0228125 A1 | 9/2009 | Stewart | |
| 2011/0053691 A1* | 3/2011 | Bryant et al. ................... | 463/37 |
| 2012/0200595 A1 | 8/2012 | Lewis et al. | |
| 2013/0054622 A1* | 2/2013 | Karmarkar et al. ........... | 707/749 |
| 2013/0131849 A1* | 5/2013 | Mere ............................... | 700/94 |
| 2014/0068692 A1* | 3/2014 | Archibong et al. ........... | 725/116 |

\* cited by examiner

*Primary Examiner* — Maurice L McDowell, Jr.
*Assistant Examiner* — Kyle Zhai
(74) *Attorney, Agent, or Firm* — Leason Ellis LLP (57) ABSTRACT

Systems and methods for selectively augmenting an electronic media file with additional content responsive to the user viewing portions of the electronic media file are provided. The system includes a computing device with a display for playing an electronic media file that includes portions that are augmentable with additional content. The system also includes a camera and image processing software to track the focus of the user's eyes on the display while looking at the electronic media file. The system can determine whether the focus of user eyes corresponds to an augmentable portion of the electronic media file and augment the electronic media file by playing additional content to the user, and then continue playing the electronic media file.

16 Claims, 4 Drawing Sheets

SYSTEM AND METHOD FOR PROVIDING AUGMENTED CONTENT

TECHNICAL FIELD OF THE INVENTION

This patent application relates generally to the field of electronic media presentation and, in particular, systems that selectively augment electronic media content according to passive user input and display the augmented content.

BACKGROUND OF THE INVENTION

Traditional forms of media content such as books, video, audio and the like provide users with a narrowly tailored experience. Books generally consist of text and images, audio is limited to sounds and videos are limited to audio-visual experiences. The content and the user's experience lacks dimension, in that, the various types of different content, such as text and video are not easily combined. To the extent that content can be combined, currently, it is not selectively combined and provided to the user in a manner that is specifically tailored to the user (e.g., the content is not combined and played as a function of the user's actual consumption of the content) without active user input (e.g., without mouse clicks or similar mechanical inputs) through personal computing devices that are portable and convenient to use.

The digital age has allowed for text and multi-media content types to be more easily combined. For example, websites often contain text with links to additional text, video or audio content. However, the transition from the first piece of media content to the additional content and then back to the first requires active user interaction such as mouse clicks. While the active input does provide the user the control over how they consume the content, active user input does not allow for a continuous or uninterrupted flow of multi-media content in a manner that can enhance the user's overall experience.

There are instances in which content types are combined without requiring active user input such as websites that include text and audio playing in the background or a movie that has visual and audio components. However, in these instances, the user lacks any control over the experience as the manner in which the various media types are provided to the user are defined entirely by the producer of the content and not activated by the user. For example, when viewing video content, the user has no input regarding the pace of the video, the direction of the story line or what portions of the story line the user wishes to focus on.

The selective combination of content without active user input is not easily achieved and requires assumptions that detract from the user experience. For example, playing audio for a specific portion of a text being displayed and not another portion cannot be accomplished without the producer making assumptions about when the user will be consuming the specific portion of the text and when the user is not. These assumptions do not provide an experience that is specifically tailored to the user and limit the complexity of the combinations of media types.

Systems and methods for passively obtaining user input are well known, including but not limited to eye tracking technology. Eye tracking technology generally falls into three categories. One type uses an attachment to the eye, such as a special contact lens with an embedded mirror or magnetic field sensor. A second type uses electric potentials measured with electrodes placed around the eyes. The third type uses non-contact, optical method for measuring eye motion. Optical methods, particularly those based on video recording, are widely used for gaze tracking and are favored for being non-invasive and inexpensive. Light, typically infrared, is reflected from the eye and sensed by a video camera or some other specially designed optical sensor. The information is then analyzed to extract eye rotation from changes in reflections. Video based eye trackers typically use the corneal reflection and the center of the pupil as features to track over time. However such eye tracking systems have not been adapted to the context of computing devices that an individual uses to consume media content in an everyday setting such as a personal computer, tablet computer, e-reader, video-game console, television and the like. To the extent that eye tracking systems have been implemented in personal computing devices, they have not been adapted for tracking a user's focus on a screen displaying a first piece of media content and automatically augmenting the content with additional, related media content of any type, thereby providing a seamless, user-controlled, multi-dimensional experience.

As such, what is desired is a system to selectively augment electronic media content with a variety of additional types of related content in a manner that is specifically tailored to the user consuming the content and to do so in a manner that does not require active user input such as a mouse click. Furthermore, it is desirable to augment and provide augmented media content to users across a variety of personal computing devices including tablet computers or e-readers, smartphones, video-game consoles, televisions and the like.

For example, in the context of an e-book, it is desirable to have a tablet computer or e-reader that can present a book to a reader, and as the reader advances through the pages, augment the book by playing video and/or audio vignettes that pertain to the section, page, paragraph, lines and/or words being read by the reader. These augmentations can occur in many sections throughout the book and are caused by passive user input thereby providing an enhanced user experience without disruption of the user's consumption and through a device that is portable and convenient to use.

As a further example, in the context of a movie being displayed on a tablet computer, computer, video-game console or television, it is desirable to have a system that can present the movie to the viewer, and as the viewer is watching the movie, passively detect the portions of the movie that the viewer is most interested in or focused on and automatically augment the movie by playing audio or video content that pertains to those portions. Thereby allowing the user consuming the content to passively alter the manner in which the content is being delivered and even altering the storyline by merely focusing on one particular portion as opposed to another.

Furthermore, it is also desirable to have a system that is capable of providing media content, passively detect the portions of the content that the viewer is focused on and automatically augment the content with related advertising media without active user input.

One challenge faced by producers of media content is that the content ages and generally becomes less relevant as time moves on and entirely new content is added to the ever growing library of books, movies, websites, publications etc. As such, it is desirable to provide a system that allows producers of media content, such as e-books, to keep their content 'evergreen' by producing updated versions with new or changed additional content and making this content easily accessible through the internet. Additionally, it is desirable to provide a system that can be utilized to enhance and update existing content. This may apply, for example, to an updated edition of an existing book, or to any version of an existing book that is enhanced with video/audio content. Similarly, it is desirable to provide a system by which numerous individuals can augment existing content with unique integration of additional content or changes to the original content much like a producer can remake an existing movie to reflect that producer's interpretation of the original work.

It is with respect to these and other considerations that the disclosure made herein is presented.

SUMMARY OF THE INVENTION

Technologies are presented herein in support of a system and method for providing augmented content. According to a first aspect, a computer implemented method for providing augmented content that is playable to a user on a computing device, such as a tablet computer, e-reader and the like is provided. The method comprises the steps of activating a camera that is in communication with the computing device. The method also includes playing an electronic media file on the display of the computing device. The electronic media file can be a media file or multi-media file in a variety of file types and formats. The method also includes monitoring the pixel image data captured by the camera, which includes at least the current position of the user's eyes while the user looks at the electronic media file being played. The pixel image data is then analyzed to discern the focal point of the user's eyes and correlating the focal point to coordinates on the display of the device. The method also includes determining whether the focal point corresponds to a location of an augmentable portion of the electronic media file being displayed. The augmentable portion can be a prescribed location in the electronic media file or can be content that matches an augmentation trigger file, such as a look-up table of trigger words. In the event the focal point corresponds to the augmentable portion of the electronic media file, the method includes causing an augmentation file associated with the augmentable portion to be played.

The method can also include repeating the steps of playing the electronic media file, monitoring the pixel image data, analyzing and discerning the focal point of the user's eyes, determining whether the focal point corresponds to a location of an augmentable portion as the user continues to interact with the computing device in the event that an augmentation file is played or not played. Furthermore, the method can also include queuing an augmentation file in the event that the focal point does not correspond to the location of augmentable portion but is in proximity to the augmentable portion.

According to another aspect, a system for providing augmented content is provided. The system having a computing device, such as a tablet computer or e-reader, having one or more processors configured to interact with a camera, a display and a computer-readable storage medium and to execute one or more software modules stored on the storage medium. The software modules include a display module that executes so as to configure the processor to play an electronic media file on the display of the computing device; a camera module that executes so as to configure the processor to activate the camera and monitor pixel image data from the camera including at least a current position of a user's eyes while the user looks at the display playing the electronic media file; an image analysis module that executes so as to configure the processor to discern a focal point of the user's eyes, to correlate the focal point of the user's eyes to coordinates on the display, and to determine whether the coordinates correspond to an augmentable portion of the electronic media file; and an augmentation module that executes so as to configure the processor to cause an augmentation file associated with the augmentable portion to be played.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

By way of overview and introduction, various systems and methods are described herein that facilitate displaying an electronic media file to a user and selectively augmenting the electronic media file with additional content in a seamless fashion without active user interaction aside from the user viewing the electronic media file on a device. The system includes a user device, such as an e-reader or a tablet computer with a display that is capable of playing electronic media files. The electronic media files can be a variety of types of digitized content such as e-books, texts, images or videos. The user device also includes eye tracking technology such as a camera and image processing software to track the focus of the user's eyes while looking at the electronic media file played by the display. Based on the location of the user's focus, the system can determine whether the particular portion of the electronic media file that the user is focused on is "augmentable", meaning that, there is additional content associated with that particular portion that can be displayed to the user. If a user is looking at an augmentable portion, the system can play an augmentation file associated with that portion, and when it is over, resume playing the electronic media file. In a variation, an augmentation file can be played concurrently with the electronic media file. The system thereby provides a uniquely integrated multi-media experience to the user and does so seamlessly without requiring a user to actively select (e.g., mouse click) portions of the electronic media file to access the additional content. In addition, the system is adapted to the environment of personal electronic computing devices. Furthermore, in accordance with a salient aspect of the invention, the system allows for independent movement of the user device and the user's eyes and head, and as such, the system is universally positionable relative to the user's eyes and head and is operable when the user device and the user's eyes and head are moving. Moreover, the system provides the user with an augmented experience using convenient and portable devices and without requiring the user or the user device to remain in a fixed position relative to one another.

The following detailed description is directed to systems and methods for the display and augmentation of electronic media content. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

Figure 1:
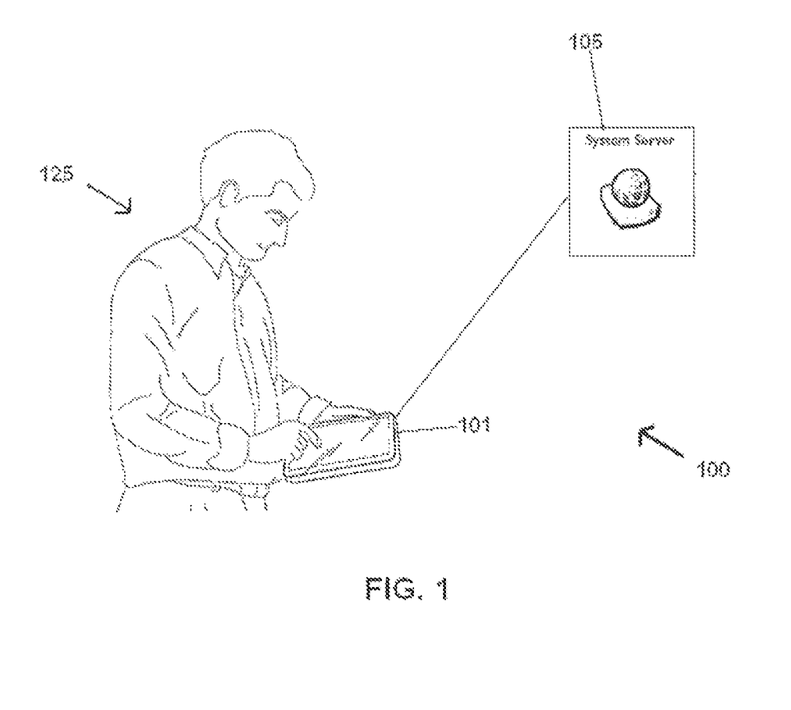
FIG. 1 is a high-level diagram illustrating an exemplary configuration of a system for providing augmented content.

An exemplary system is shown as a block diagram in FIG. 1 which is a high-level diagram illustrating an exemplary configuration of a system for providing augmented content 100. In one arrangement, the system consists of a system server 105 and at least one user device 101. It should be understood that system server 105 can be practically any computing device and/or data processing apparatus capable of communicating with user device and receiving, transmitting and storing electronic information including electronic content as further described herein.

User device 101 can be configured to communicate with the system server 105, transmitting electronic information to and receiving electronic information, including electronic content, from the system server as further described herein. User device is also configured to play various types of electronic content, such as electronic media files and augmentation files, to the user (125). It should be understood that the term "play" as used herein can include but is not limited to visual display, audio output, and tactile feedback. "Play" should not be interpreted to mean that the electronic content played, displayed or otherwise output by user device is limited to having a temporal scope i.e. a having specific run time such as a video. Accordingly, play is used interchangeably with display and output. It should be understood that user device can be any computing device and/or data processing apparatus capable of embodying the systems and/or methods described herein, including but not limited to a personal computer, tablet computer, e-reader or smart phone device. It should be understood that the system server 105 is not a required part of the present invention; the system server communicates with the user device 101 and can be used to supply electronic information as described more fully next.

Figure 2:
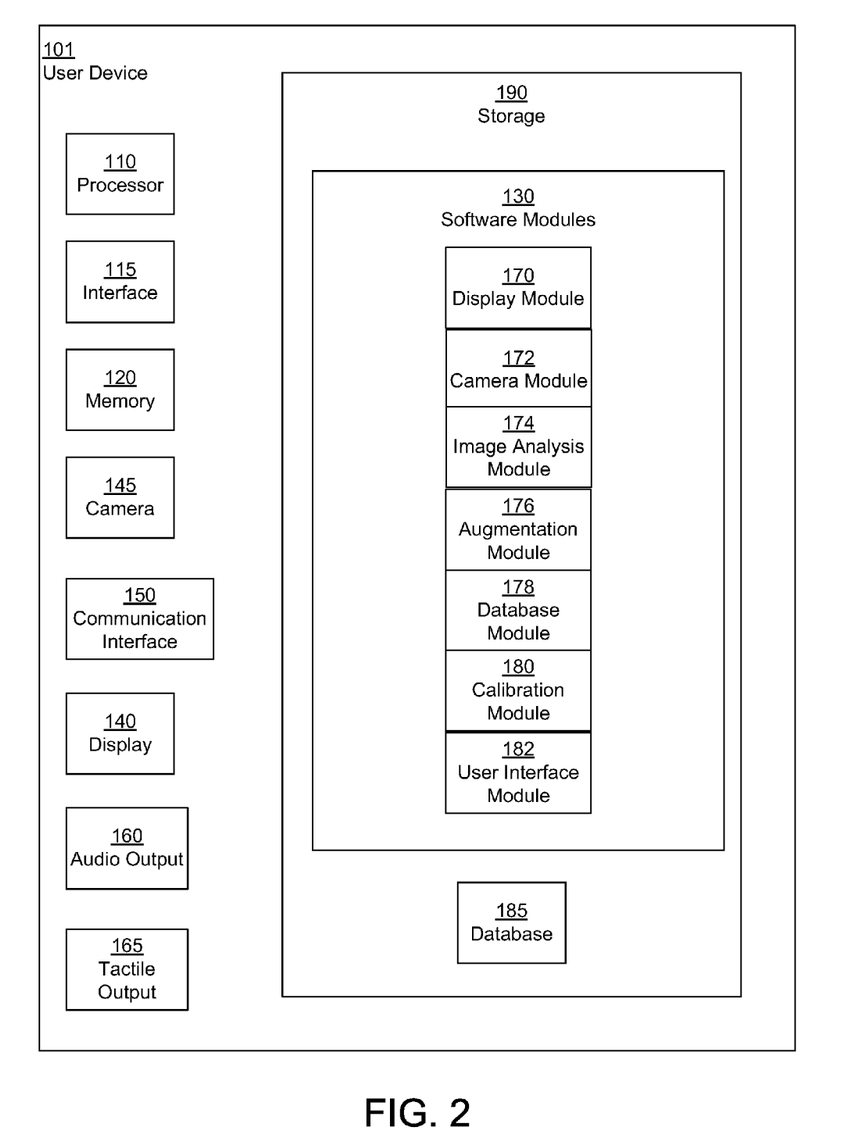
FIG. 2 is a block diagram illustrating an exemplary configuration of a system for providing augmented content.

In reference to FIG. 2, user device 101 of the system for providing augmented content 100, includes various hardware and software components that serve to enable operation of the system, including a processor 110, memory 120, display 140, camera 145, audio output 160, tactile output 165, storage 190 and a communication interface 150. Processor 110 serves to execute software instructions that can be loaded into memory 120. Processor 110 can be a number of processors, a multi-processor core, or some other type of processor, depending on the particular implementation. It should be understood that some of the foregoing components, such as the tactile output, are not required to enable operation of the system for providing augmented content 100 in accordance with the disclosed embodiments, as would be understood by those skilled in the art.

Preferably, memory 120 and/or storage 190 are accessible by processor 110, thereby enabling processor to receive and execute instructions stored on memory and/or on storage. Memory can be, for example, a random access memory (RAM) or any other suitable volatile or non-volatile computer readable storage medium. In addition, memory can be fixed or removable. Storage 190 can take various forms, depending on the particular implementation. For example, storage can contain one or more components or devices such as a hard drive, a flash memory, a rewritable optical disk, a rewritable magnetic tape, or some combination of the above. Storage also can be fixed or removable.

One or more software modules 130 are encoded in storage 190 and/or in memory 120. The software modules can comprise one or more software programs or applications having computer program code or a set of instructions executed in processor 110. Such computer program code or instructions for carrying out operations for aspects of the systems and methods disclosed herein can be written in any combination of one or more programming languages. The program code can execute entirely on user device 101, as a stand-alone software package, partly on user device, partly on system server 105, or entirely on system server or another remote computer/device. In the latter scenario, the remote computer can be connected to user device 101 through any type of network, including a local area network (LAN) or a wide area network (WAN), or the connection can be made to an external computer (for example, through the Internet using an Internet Service Provider).

Preferably, included among the software modules 130 is a display module 170, a camera module 172, an image analysis module 174, an augmentation module 176 and a database module 178, calibration module 180 and user interface module 182 that are executed by processor 110. During execution of the software modules 130, the processor configures the user device 101 to perform various operations relating to providing augmented content, as will be described in greater detail below.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within the system for providing augmented content 100. In addition, it should be noted that other information and/or data relevant to the operation of the present systems and methods (such as database 185) can also be stored on storage, as will be discussed in greater detail below.

Also preferably stored on storage 190 is database 185. As will be described in greater detail below, database contains and/or maintains various data items and elements that are utilized throughout the various operations of the system for providing augmented content 100. The information stored in database can include but is not limited to, electronic media files and other electronic information, as will be described in greater detail herein. It should be noted that although database is depicted as being configured locally to user device 101, in certain implementations database and/or various of the data elements stored therein can be located remotely (such as on a remote device or server—not shown) and connected to user device through a network in a manner known to those of ordinary skill in the art.

An interface 115 is also operatively connected to the processor. The interface can be one or more input device(s) such as switch(es), button(s), key(s), a touch-screen, microphone, etc. as would be understood in the art of electronic computing devices. Interface serves to facilitate the capture of commands from the user such as an on-off commands, commands to interrupt or alter playing of the electronic content or settings related to operation of the system for providing augmented content 100. For example, interface can be used to allow the user to deactivate features of system such as the augmentation of an electronic media file as further described herein. Interface also serves to facilitate the capture of certain information from the user device 101 such as user information related to the purchase of media content.

Display 140 is also operatively connected to processor the processor 110. Display includes a screen or any other such presentation device which enables the system to play and the user to view various electronic media files. By way of example, display can be a digital display such as a dot matrix display or other 2-dimensional display. Moreover, display can also be a three dimensional display as well, as would be understood by those skilled in the art.

By way of further example, interface and display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, interface communicates this change to processor, and settings can be changed or user entered information can be captured and stored in the memory.

Camera 145 is also operatively connected to the processor 110. Camera can be one or more imaging devices of the type that are configured to capture images of at least a portion of the user's body including the user's eyes and/or face while utilizing the user device 101 for the purpose of tracking the eye's focus, also commonly referred to as gaze tracking. Camera serves to facilitate the capture of passive user input from the focus of the user's eyes. Camera can also include one or more light or signal emitters that are commonly found in eye tracking systems such as infrared light emitters. Camera can be integrated into the user device 101, such as a front-facing camera. Alternatively, camera can be external to the user device (e.g. mounted to the user device). The possible variations of camera 145 and the systems and methods for capturing and analyzing the image data collected by camera to determine the focal point of a user's eyes would be understood by those skilled in the art. The following references all concern systems and methods for eye tracking and are hereby incorporated by reference as if set forth in their respective entireties herein: U.S. Pat. No. 6,578,962 titled "Calibration-free eye gaze tracking"; U.S. Pat. No. 8,135,173 titled "Eye-tracking method and eye-tracking system for implementing the same"; U.S. Pat. No. 7,197,165 titled "Eye tracking using image data". Although the exemplary embodiments are discussed in relation to eye tracking systems that incorporate one or more imaging devices on or attached to the user device, it should be understood that any suitable eye tracking systems can be used to discern the focal point of a user's eyes while looking at the display, including but not limited to head mounted optical systems or eye tracking systems that incorporate specialized contact lenses with integrated sensors or markers.

Audio output 160 is also operatively connected to the processor 110. Audio output can be any type of speaker system that is configured to play electronic audio files as would be understood by those skilled in the art. Audio output can be integrated into the user device 101 or external to the user device.

Tactile output 165 is also operatively connected to the processor 110. Tactile output can be any type of haptic feedback system that provides a mechanical stimulation to the user as would be understood by those skilled in the art. For example and without limitation, tactile output can be a vibrating system within the user device or a mechanically movable seat. In addition tactile output can be integrated into the user device 101 or external to the user device.

Communication interface 150 is also operatively connected to the processor 110 and can be any interface that enables communication between the user device 101 and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting user device to other computing devices and/or communication networks such as private networks and the Internet. Such connections can include a wired connection or a wireless connection (e.g. using the 802.11 standard) though it should be understood that communication interface can be practically any interface that enables communication to/from the user device.

At various points during the operation of the system for providing augmented content 100, user device 101 can communicate with one or more computing devices, such as system server 105, each of which will be described in greater detail herein. Such computing devices transmit and/or receive data to/from user device 101, thereby preferably initiating maintaining, and/or enhancing the operation of the system for providing augmented content 100, as will be described in greater detail below.

It should be noted that while FIG. 1 depicts the system for providing augmented content 100 with respect to a user device 101, it should be understood that any number of user devices can interact with the system for providing augmented content 100 in the manner described herein. It should also be noted that while FIG. 1 depicts an electronic media content augmentation system with respect to user 125, it should be understood that any number of users can interact with the system in the manner described herein.

It should be further understood that while the various computing devices and machines referenced herein, including but not limited to user device 101 and system server 105 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the system for providing augmented content 100 and the various elements and components described above will be further appreciated with reference to the method for facilitating the augmentation of electronic media content as described below, in conjunction with FIG. 3 and FIG. 4.

Figure 3:
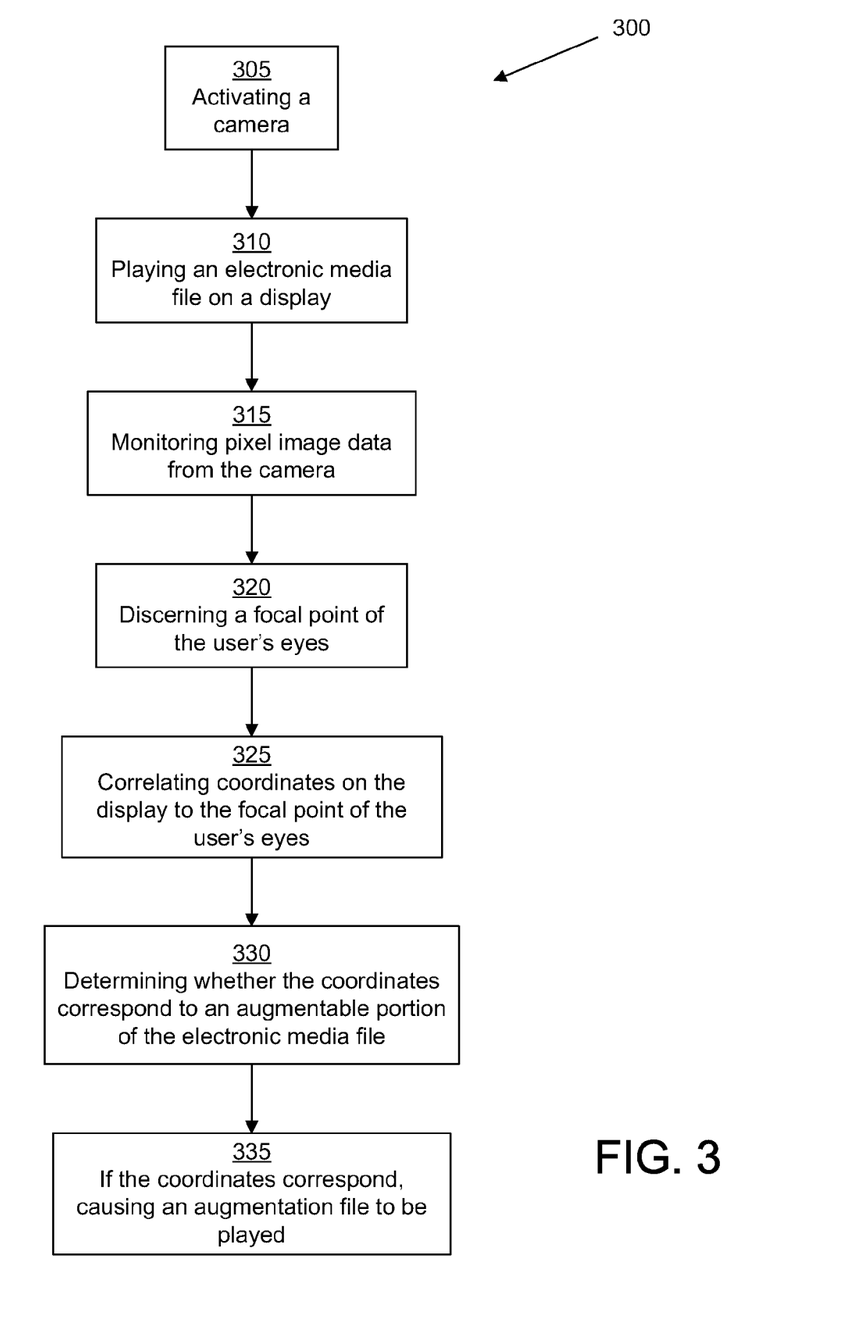
FIG. 3 is a flow diagram illustrating a routine for providing augmented content with at least one embodiment disclosed herein.
Figure 4:
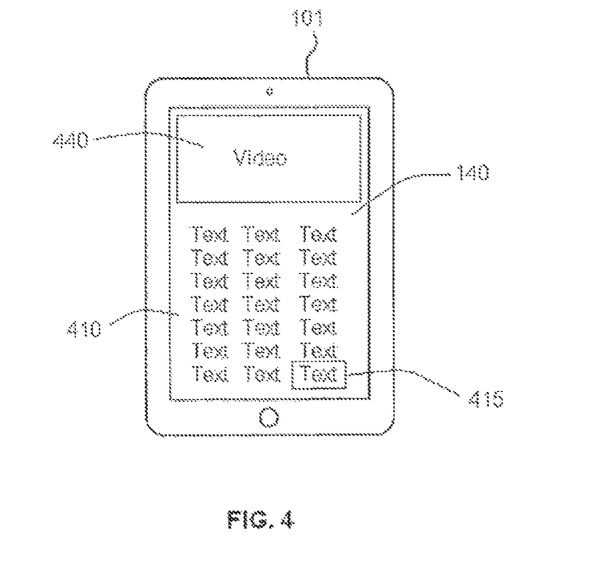
FIG. 4 depicts a screenshot of an exemplary device playing augmented content in accordance with at least one embodiment disclosed herein.

Turning now to FIG. 3, a flow diagram illustrates a routine 300 for the augmentation of electronic media content in accordance with at least one embodiment disclosed herein. It should be appreciated that more or fewer operations can be performed than shown in the figures and described herein. These operations can also be performed in a different order than those described herein.

The process begins at step 305, where processor 110 executing one or more of software modules 130, including, preferably camera module 172, configures user device 101 to activate camera 145. Camera 145 can continually or at specific intervals capture pixel image data of at least the user's eyes while the user is utilizing the user device. Processor executing camera module can also configure the user device to record the captured pixel image data and associated information such as timestamps to storage 190 or memory 120 for further processing to determine the focal point of the user's eyes, as further described herein.

Then at step 310, processor 110 executing one or more of software modules 130, including, preferably display module 170, configures user device 101 to play an electronic media file on the display 140 of user device. Electronic media files and augmentation files can be a variety of types of digitized media content as would be understood by those in the art, including by example and without limitation, e-books, videos, images, audio files, website content, text and combinations thereof. Furthermore, the electronic media files and augmentation files can have a variety of file formats, including but not limited to, Archos Diffusion, Broadband eBooks, eReader, Comic Book Archive, HTML, compiled HTML, EPUB, MPG, WAV, mp3, pdf, jpeg, gif, plain text, formatted text.

Electronic media files and augmentation files can be preformatted in a specialized file format that is compatible with the system for providing augmented content 100 and/or the particular type of user device 101. Alternatively the electronic media files and augmentation files can be an original file that is converted by the system from its original format into a compatible format. As a further alternative, electronic media files and augmentation files that are in an original format that are not compatible with all features of the system for providing augmented content 100 can be played by the user device in conjunction with an adaptation file that provides the information necessary to enable any feature of the system unsupported by the original file format.

Processor executing one or more software modules 130, including preferably database module 178, can configure user device to download electronic media files from system server 105 via communication interface 150 and store the electronic media file to storage 190 and/or memory 120. Alternatively, electronic media files can be downloaded directly into storage or memory of the user device 101 from removable storage devices such as a USB key. Preferably, the electronic media file is stored by the user device in advance of playing according to step 310 to promote quick file access and playback. However, it should be understood that transfer of the file to storage and memory can occur in segments or continuously concurrent with playing.

System server 105 can be operated by any number of providers of electronic content. For example, e-books can be downloaded from, say, online e-book publishers such as AMAZON® LLC.

Then, at step 315, processor 110 executing one or more of software modules 130, including, preferably camera module 172, configures user device 101 to monitor the pixel image data gathered by the camera at step 305. The user device monitors at least the position of the user's eyes while the user looks at the display playing the electronic media file. The position of the user's eyes can include the location of the eyes and other points on the user's face (e.g., eye lids, eye brows, forehead, nose) and the location of points on the eyes (e.g. pupil, iris, sclera, eyelid) relative to one another and the camera 145.

Then, at step 320, processor 110 executing one or more of software modules 130, including, preferably image analysis module 174, configures user device 101 to discern from at least the position of the user's eyes monitored at step 315 the focal point of the user's eyes. More particularly, the location of the user's eyes can be calculated according to an algorithm that is a function of the geometry formed by the points on and/or around the user's eyes and face relative to each other and the camera. The location of the user's eyes can also be calculated as a function of the location of the camera relative to the display 140 of user device. Furthermore, the location of the user's eyes can be calculated as a function of the location of the camera relative to a light emitting source.

For example, and in accordance with a salient aspect of the present invention, at some point before step 315, whether upon initial set-up of the system, or prior to each use of the system or at set intervals (say, once a week), the processor executing one or more software modules, including preferably camera module 172 or image analysis module 174 or calibration module 180 configures the user device to perform a calibration process. The calibration process can be used to determine the baseline facial geometry of the user. The user's baseline facial geometry can be determined from the location of various points on or around the eyes at a given distance from the camera 145 and at a given orientation of the user device relative to the user's face and the camera's position relative to the display 140. Because the user's facial geometry will vary depending on the position of the user's face relative to the camera, the processor can mathematically compare the user's baseline facial geometry to the user's facial geometry determined at step 315 and determine the relative position of the user's face to the user device. It should be understood that the relative position of the user's face to the user device can also be a function of data collected from integrated position sensors, including but not limited to, a gyroscope or accelerometer. In addition, multiple baseline facial geometries can be calculated at a variety of possible orientations of the device such as landscape or portrait mode.

A focus vector corresponding to the direction that the user's eyes are looking can be calculated by applying an algorithm that is a function of, including but not limited to, the location of points on the eyes (e.g. pupil, iris, sclera, eyelid) and points around the eyes (e.g., eye lids, eye brows, forehead, nose) relative to one another and the camera 145. The focal point can be calculated according to an algorithm that is a function of the focus vector and the relative position of the user's face to the user device 101. Accordingly, the system can determine the focal point of a user even when the relative position of the user's face and the user device has shifted, and allows the system to function without requiring a fixed distance or orientation of the user device or the user's face. Furthermore, in accordance with a salient aspect of the invention, the system allows for independent movement of the user device and the user's eyes and head, and as such, the system is universally positionable relative to the user's eyes and head and is operable when the user device and the user's eyes and head are moving. The system is also operable in any orientation of the user device such as portrait or landscape mode.

Although determining the focus of the user's eyes has been described in relation to a facial geometry that can incorporate points on and around the eyes, it should be understood that eye tracking technology can be used to determine the focus of a user's eyes based on points on the eyes or using any other eye tracking systems and methods as would be understood by those skilled in the art.

Then, at step 325, Processor 110 executing one or more of software modules 130, including, preferably image analysis module 174, configures user device 101 to correlate the focal point as determined in step 320 to a coordinates on the display 140. Correlating the focal point to coordinates on the display can be determined according to an algorithm that overlays a Cartesian coordinate system over the display and converts the focal point to the Cartesian coordinate system to generate focal point coordinates. Preferably, the system for providing augmented content 100 is operable on user devices with displays of various sizes, for example, some user devices can have, say, a 7 inch display while another can have a 10 inch display. As such, the scale of the Cartesian coordinate system can be varied from one user device to another to accommodate the specific size and shape of the display.

Then, at step 330, Processor 110 executing one or more of software modules 130, including, preferably augmentation module 174, configures user device 101 to determine whether the focal point coordinates determined at step 325 correspond to the location of an augmentable portion of the electronic media file.

The locations of augmentable portions of the electronic media file and the one or more augmentation files associated with the augmentable portions can be pre-defined by the creator of the electronic media file. For example, the creator can specify that, say, the word "boom" on the fourth page of an e-book is augmentable and corresponds to an augmentation file that is an audio-visual clip of lightning and thunder. The location of augmentable portions and the identifier of the associated augmentation file can be included in the electronic media file. Alternatively, this information can be included in a separate mapping file that corresponds to the electronic media file and/or the particular type of user device. Accordingly, a single electronic media file can be adapted to a wide variety of user devices by creating a mapping file and without requiring the creation of electronic media files specific to each type of user device.

Alternatively, or in addition, processor 110 executing one or more software modules 130 can configure the user device 101 to analyze the electronic media file to automatically detect portions of the electronic media file that have not been previously defined as augmentable but are nonetheless augmentable and associate one or more augmentation files with those portions. Methods by which the system can analyze the content of the electronic media files and augmentation files would be understood by those skilled in the art. The content can be compared to a trigger file that contains trigger content, such as trigger words, that are associated with one or more augmentation files in order to identify the portions of the electronic media file that are augmentable. The identified augmentable portions can be designated as augmentable portions and one or more augmentation files can be associated with those portions. For example, the electronic media file can be analyzed using a word recognition program, such as optical character recognition to identify the words contained in the electronic media file. The recognized words can be compared to a look up table of trigger words and in the event one or more of the recognized words match a particular trigger word, the electronic media file can be modified so that the particular recognized word is an augmentable portion of the electronic media file. Alternatively, or in addition, a mapping file can be created to note the location of the identified augmentable portion and associate it with one or more augmentation file.

It should be understood that the trigger content is not limited to just trigger words, but can include phrases, images, audio and video information as well as other indicators of context. As a result, the system can compare the content and context of the portions of the electronic media file with the trigger content and context to identify appropriate augmentation files that are appropriate. For example, the word "crack" in the context of "gunshot" can be differentiated from "crack" in the context of "thunder".

Processor 110 executing one or more software modules 130, including, preferably augmentation module can configure user device 101 to determine what segment of the electronic media file is being played on the display 140 at a particular point in time according to an algorithm that is a function of the display size, display settings and the current position of the electronic media file. For example, if user device is playing an electronic media file that is, say, an e-book that is arranged in pages such that a single page is played on the display at a time, the segment of the e-book being displayed at a point in time is the particular entire page being displayed. By way of further example, if the e-book is arranged in pages that are continuously linked (e.g. word wrap is enabled) such that the user can scroll up or down through the pages, there is a possibility that at a particular time the display may be showing at least a portion of multiple pages at a time. In such an event, the portion of the e-book is being displayed can be determined according to the position in the e-book and the size of the display. The portion displayed can also be dependent on display settings such as resolution or zoom or whether the device is switched from portrait mode to landscape mode. Based on the determination of which segment of the electronic media file is being displayed on the display, the user device can further determine whether that particular segment contains any augmentable portions. If that particular segment contains one or more augmentable portions, the user device can overlay a Cartesian coordinate system over the segment being displayed and assign augmentation coordinates to the one or more augmentable portions. It should be understood that the augmentation coordinates that correspond to a particular augmentable portion are not limited to a single point on the display and can be range of coordinates that define a multi-dimensional area.

In the event that the segment of the electronic media file being displayed includes one or more augmentable portions, the system can compare the focal point coordinates to the augmentation coordinates to determine if the coordinates correspond. The manner in which focal point coordinates can correspond to the augmentation coordinates can vary. The system can require a single set of focal point coordinates to match the augmentation coordinates. Alternatively, the system can require multiple sets of focal point coordinates collected over a period of time to match the augmentation coordinates, thereby suggesting the user's deliberate focus on the augmentable portion rather than an inadvertent or passing glance. As a further alternative, the system can require multiple focal point coordinates over a period of time to approach the location of an augmentable portion in a predefined fashion, say, a horizontal, linear fashion before intersecting with the location of the augmentable portion, thereby suggesting the user's deliberate focus on the augmentable portion rather than an inadvertent or passing glance. The ways in which the coordinates are determined to correspond can be varied depending on factors including system capabilities (e.g., sensitivity of the imaging device and image processing system), the types of electronic media file being played (e.g., an e-book read from left to right top to bottom may require focal points to track a line of text before intersecting with the augmentable portion) and user defined settings regarding preferences and sensitivity (e.g., a user who tends to glance around a page a lot may not want inadvertent passing glances to activate augmentable content) The prescribed ways in which focal point coordinates can correspond to the location of a particular augmentable portion are provided as examples and without limitation, and variations would be understood by those skilled in the art.

Then, at step 335, if the focal point coordinates correspond to the augmentation coordinates of a particular augmentable portion, Processor 110 executing one or more of software modules 130, including, preferably augmentation module 174, configures user device 101 to play one or more augmentation files associated with the particular augmentable portion.

As mentioned above, augmentation files can include one or more of a variety of types of digitized electronic media content in a variety of file formats as would be understood by those skilled in the art. For example, an augmentation file can include an audio component for playing by audio output 160, a video component for playing on display 140 as well as a haptic feedback component for playing or executing by tactile output 165. It should also be understood that electronic media files and augmentation files are not required to be distinct files as augmentation files can be embedded in the electronic media files, as can be any associated adaptation files, mapping files or trigger files.

Augmentation files can be played concurrent to the playing of the electronic media file, for example, an audio file that is played through the audio output 160 while the electronic media file is played on display 140, or a video file that is played on display such that it is overlaid on at least a portion of the electronic media. Alternatively, playing of the electronic media file can be halted while the augmentation file is played and resumed after the augmentation file is played. Any number of visual effects can be incorporated into the display of the electronic media file and/or augmentation file and transitions between said files, including fading in and/or out or other such visual effects as would be understood by those skilled in the art. As mentioned previously the user device can be configured to convert at least a portion of the electronic media file or the augmentation file to a different file type or format. File type conversion can be done, for example and without limitation, depending on the capabilities of the user device or in the event that the augmentation file and electronic media file are not in compatible formats that can be played concurrently. For example, if electronic media file is, say, a text file and augmentation file is, say, a video file and limitations of the file types or display 140 prevent the two files from being played on display 140 at the same time, user device can convert the portion of the electronic media file displayed immediately prior to playing the augmentation file, to an alternative file format, say, an image file that can be displayed behind the augmentation file video so as to present the user with, the experience of concurrent playback when in fact playback of the electronic media file has been halted pending the playback of the augmentation file. Turning briefly to FIG. 4, an exemplary user device 101 is shown and a screenshot of the display 140 showing a portion of an augmentation file 440 superimposed over a segment of an electronic media file 410 having an augmentable portion 415.

Upon completion of playing the augmentation file at step 335, or in the event of a user command that interrupts playing, the system for providing augmented content 100 can resume playing the electronic media file and repeat steps 310-335. Alternatively, the augmentation file can play concurrently with the electronic media file until the end of the augmentation file or upon receipt of a user command. As a further alternative, the augmentation file can also prompt a different electronic media file to be played or advance the electronic media file to a different portion from the portion played by the electronic media file prior to playing the augmentation file. As a further alternative, augmentation file can also include one or more augmentable portions, that when focused on by the user's eyes can cause additional augmentation files or electronic media files to be played in accordance with the disclosed exemplary embodiments. It should be understood that the steps of routine 300, in particular steps 310-335, are intended to be repeated whether or not an augmentation file is played at step 335 until the end of the electronic media file is reached or upon the user stopping the electronic media file. Processor 110 executing one or more software modules 130, including, image analysis module 174, and user interface module 182, can configure user device to receive user commands via user interface 115 and/or from monitoring and analyzing eye focus information as discussed above, and execute the user commands to perform a variety of functions including interrupt playing of the electronic media file or augmentation file, or otherwise alter the playing of the electronic media file or augmentation file and other similar functions as would be understood by those skilled in the art. It should also be understood that while playing an electronic media file or an augmentation file, the system can continue to perform the steps of monitoring pixel image data, discerning a focal point, correlating the focal point to focal point coordinates and determining whether the focal point corresponds to an augmentable portion of an electronic media file and/or augmentation file and playing electronic media files and/or augmentation files in accordance with aspects of the disclosed embodiments.

Furthermore, in the event that, at step 335, a particular augmentation file is not played but the focal point coordinates correspond to the augmentation coordinates of the particular augmentable portion in a prescribed manner, Processor 110 executing one or more of software modules 130, including, preferably augmentation module 174, can configure user device 101 to queue an augmentation file associated with the particular augmentable portion into memory. Queuing the augmentation file into memory can involve transferring the augmentation file from storage into memory for quick access and playback of the augmentation file. Alternatively, queuing the augmentation file can involve downloading the augmentation file from a remote station such as system server 105.

The focal point coordinates can trigger the user device to queue the particular augmentation file if they correspond to the particular augmentation coordinates in a variety of ways, including, if the focal point coordinates are in proximity to the particular augmentation coordinates or the focal point coordinates over a period of time approach the particular augmentation coordinates in, say, a linear fashion. These examples are not limiting as there are numerous ways in which a user's focal pattern can be interpreted to suggest that the user's focus is approaching a particular augmentable portion as would be understood by those skilled in the art.

At this juncture, it should be noted that although much of the foregoing description has been directed to systems and methods for providing augmented content, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for providing augmented content. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method for the augmentation of an electronic media file, of the type that is playable to a user on a computing device having an integrated position sensor, a processor and a non-transitory computer readable storage medium and code in the form of one or more software modules stored on the storage medium and executable in the processor, the method comprising:
   activating a camera mounted to the computing device and the integrated position sensor;
   playing an electronic media file on a display of the computing device, wherein playing the electronic media file includes displaying electronic media content on the display, wherein the electronic media content is video content and wherein playing the electronic media content also includes playing audio content through an associated audio output;
   monitoring, using code executing in the processor, pixel image data from the camera including at least a current position of the user's eyes while the user looks at the display playing the video content;
   monitoring, using code executing in the processor, position data from the integrated position sensor including at least a current orientation of the computing device;
   discerning, using code executing in the processor, a focal point of the user's eyes based on the current position of one or more portions of the user's eyes and the current orientation of the computing device;
   correlating, using code executing in the processor, coordinates on the display to the focal point of the user's eyes at a particular point in time;
   determining, using code executing in the processor and based on the coordinates and the electronic media content being displayed by the display, whether the coordinates correspond to an augmentable portion of the video content being displayed by the display at said particular point in time, wherein the augmentable portion is a prescribed location within the video content displayed by the display at said particular point in time; and
   in the event that the coordinates correspond to the augmentable portion of the video content displayed by the display at said particular point in time, causing an augmentation file associated with the augmentable portion to be played by the computing device, wherein the augmentation file is a multimedia file, and wherein playing the augmentation file includes playing video on the display and playing audio through an associated audio output, and wherein, in the event that the augmentation file is played, the playing of the electronic media content is halted pending the playing of the augmentation file;
   in the event that the coordinates do not correspond to the augmentable portion of the video content displayed by the display at said particular point in time and are in proximity to the augmentable portion, queuing the augmentation file;
   in the event that the coordinates do not correspond to the augmentable portion of the video content displayed by the display at said particular point in time, repeating the monitoring, discerning, correlating and determining steps as the user continues to interact with the computing device; and
   after causing the augmentation file to be played, repeating the monitoring, discerning, correlating and determining steps as the user interacts with the computing device.

2. The method of claim 1, wherein the augmentable portion is content that matches an augmentation trigger file portions of the electronic media file that have not been previously defined as augmentable but are nonetheless augmentable and associate one or more augmentation files with those portions.

3. The method of claim 2, wherein the augmentation trigger file is a look-up table of trigger words.

4. The method of claim 1, wherein the electronic media content includes text and wherein the augmentable portion is a prescribed location of one or more words in the text.

5. The method of claim 4, wherein the augmentable portion is one or more words of the text.

6. The method of claim 1, wherein the augmentation file is a media file.

7. The method of claim 1, wherein the augmentation file is a multimedia file.

8. The method of claim 1, wherein the electronic media file is a multimedia file.

9. The method of claim 1, wherein playing the augmentation file includes providing tactile feedback through an associated tactile feedback device.

10. The method of claim 1, wherein playing the electronic media file includes providing tactile feedback through an associated tactile feedback device.

11. The method of claim 1, wherein in the event that an augmentation file is played the augmentation file is played concurrent to playing the electronic media file.

12. A system for augmenting an electronic media file having a computing device and one or more processors configured to interact with a camera, a display and a non-transitory computer-readable storage medium and to execute one or more software modules stored on the storage medium, comprising:
  a display module that when executed by the processor configures the processor to play an electronic media file on the display of the computing device, wherein playing the electronic media file includes displaying electronic media content on the display, wherein the electronic media content is video;
  a camera module that when executed by the processor configures the processor to activate the camera and monitor pixel image data from the camera including at least a current position of a user's eyes while the user looks at the display playing the electronic media file and to activate an integrated position sensor and monitor position data from the integrated position sensor including at least a current orientation of the computing device;
  an image analysis module that when executed by the processor configures the processor to discern a focal point of the user's eyes based on the current position of one or more portions of the user's eyes and the current orientation of the computing device, to correlate the focal point of the user's eyes at a particular point in time to coordinates on the display, and to determine whether the coordinates correspond to an augmentable portion of the video content being displayed by the display at said particular point in time, based on the coordinates and the video content being displayed at said particular point in time, and wherein the augmentable portion is a prescribed location within the video content displayed by the display at said particular point in time; and
  an augmentation module that when executed by the processor configures the processor to cause an augmentable file associated with the augmentable portion to be played in the event that the coordinates correspond to the augmentable portion of the video content displayed by the display at said particular point in time, wherein the augmentation file is an audio file, and wherein playing the augmentation file includes playing audio through an associated audio output;
  wherein the augmentation module is further configured to, in the event that the coordinates do not correspond to the augmentable portion of the video content displayed by the display at said particular point in time and are in proximity to the augmentable portion, queue the augmentation file; and
  wherein the image analysis module is further configured to, in the event that the coordinates do not correspond to the augmentable portion of the video content displayed by the display at said particular point in time, repeating the monitoring, discerning, correlating and determining steps as the user continues to interact with the computing device.

13. The system of claim 12, wherein the camera is mounted to the computing device.

14. The system of claim 12, wherein the computing device is a portable electronic device.

15. The system of claim 12, further comprising an audio output.

16. The system of claim 12, further comprising a tactile feedback device.

* * * * *